3,408,743
WHEEL ALIGNING DEVICE FOR THE FRONT END OF AN AUTOMOBILE

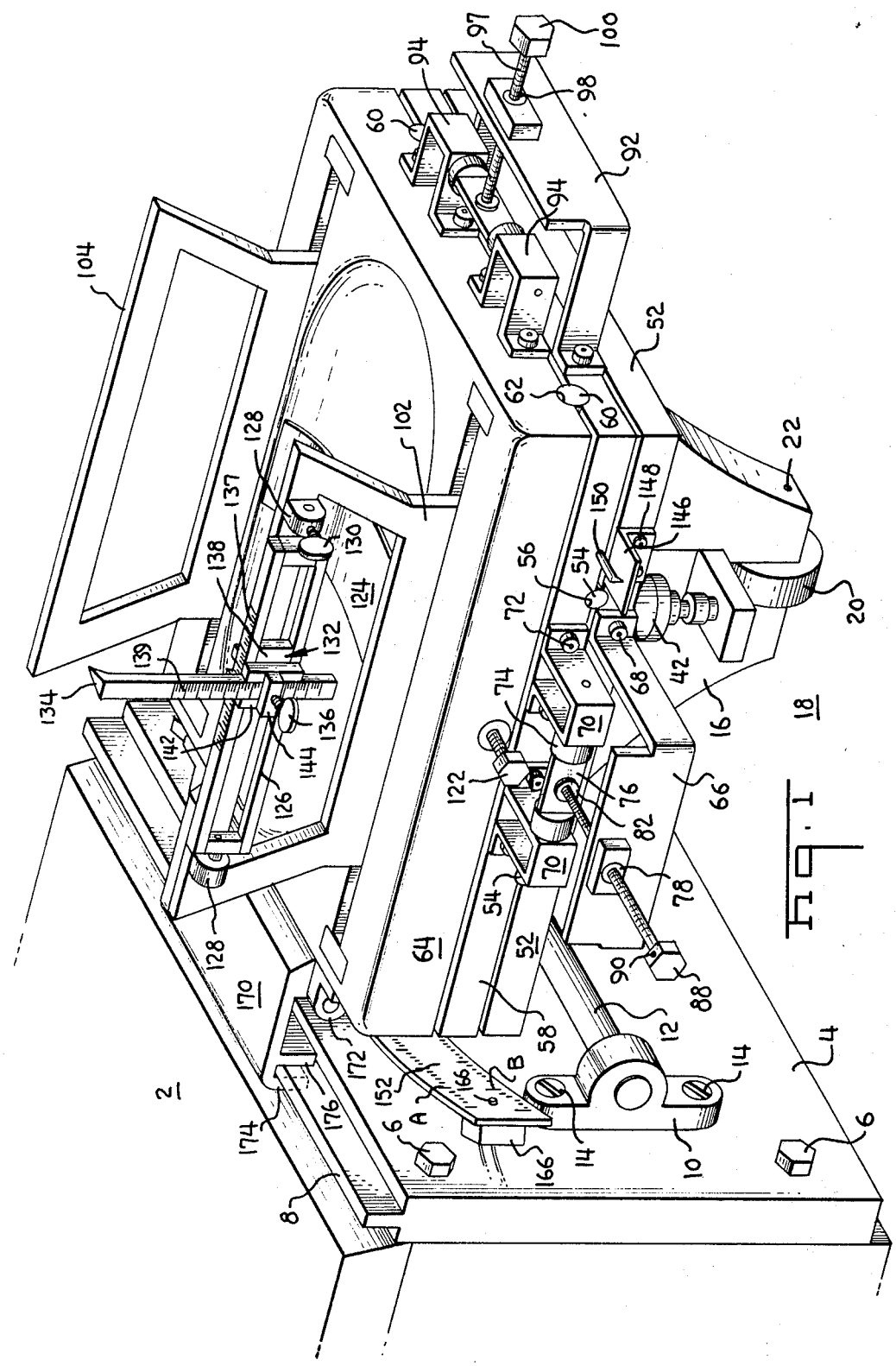

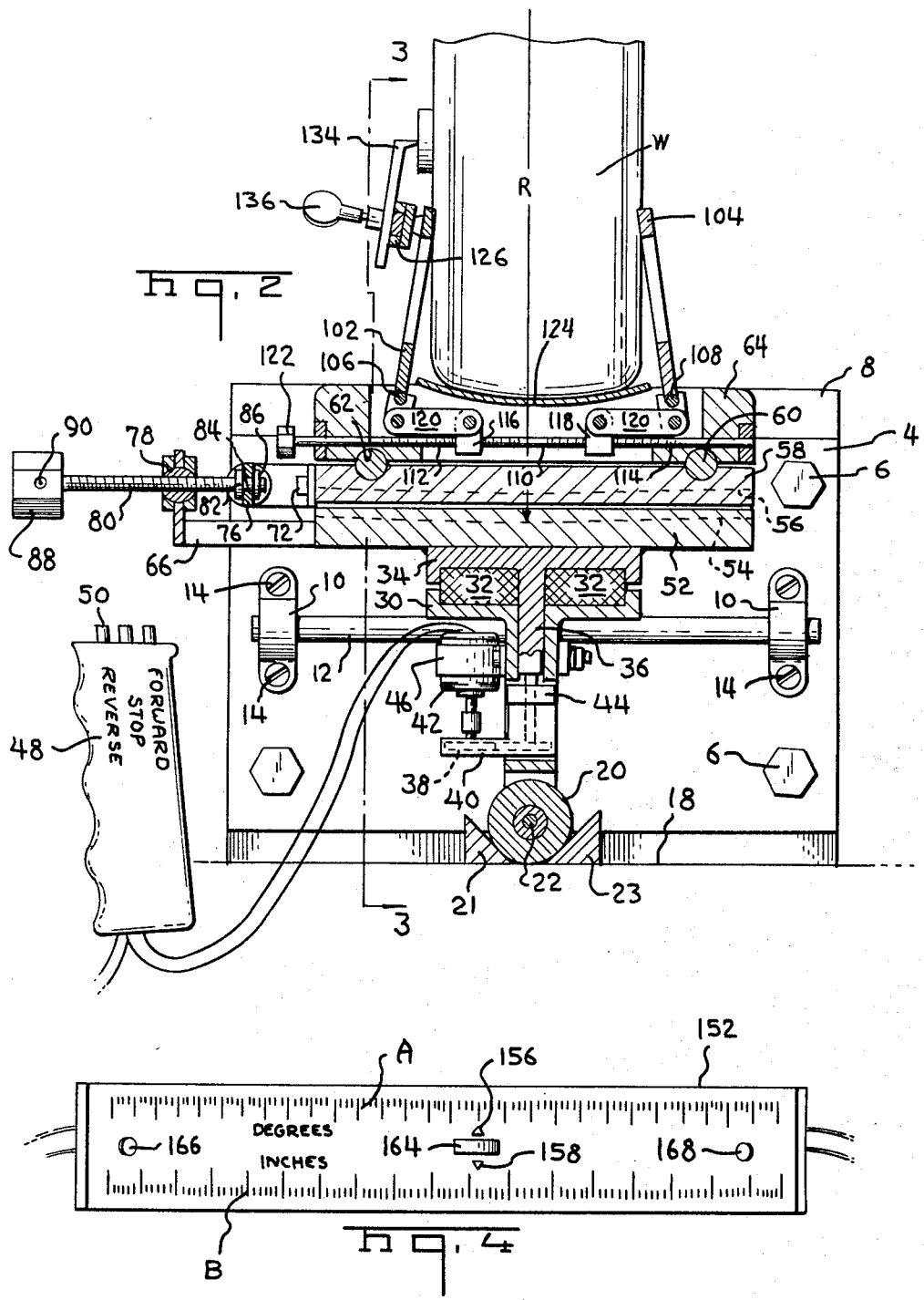

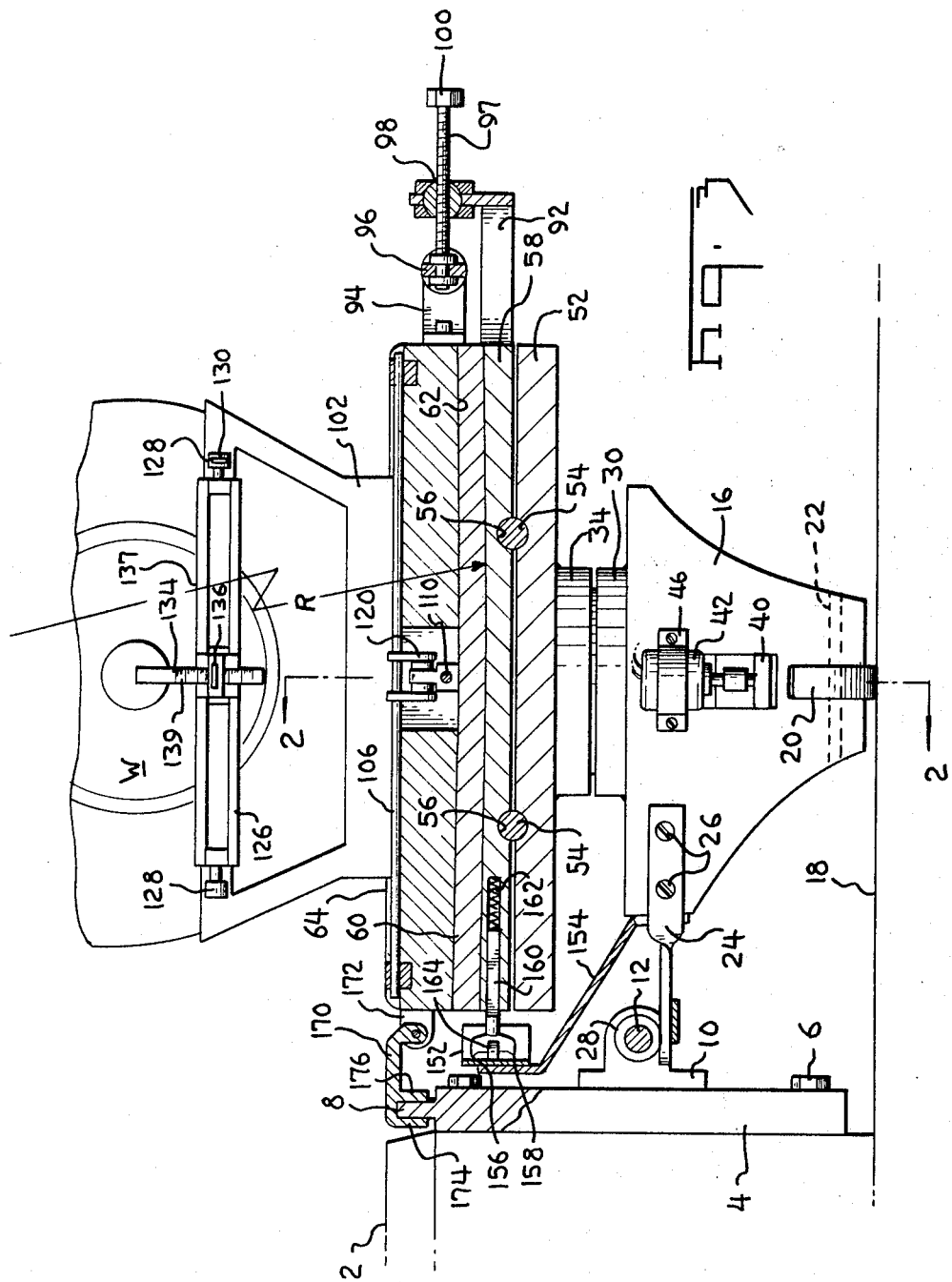

Melvin E. Piper, 2324 Union Ave., Altoona, Pa. 16602
Continuation-in-part of application Ser. No. 378,270, June 26, 1964. This application Oct. 10, 1966, Ser. No. 585,446
14 Claims. (Cl. 33—203.12)

ABSTRACT OF THE DISCLOSURE

Wheel aligning device for the front end of an automobile. A carriage is mounted at each end of a ramp for gripping and supporting a wheel. A plurality of measuring devices are incorporated on each carriage to measure the looseness, straightness and misadjustment of the front end parts. The caster and camber can be set while the wheels are gripped and moved into the proper caster and camber positions.

---

This invention relates to a wheel aligning device for the front end of an automobile and is an improvement over and is a continuation-in-part of my copending application, Ser. No. 378,270, filed June 26, 1964, now Patent No. 3,346,965.

Wheel aligning devices for measuring caster and camber are well known and serve to aid in the alignment of the wheels in a most efficient manner. However, the proper alignment of the front end depends on the mechanical condition of the wheel mounting mechanism as well as proper caster and camber. It is therefore an object of this invention to provide a device for checking the mechanical condition of the wheel mounting mechanism as a means to proper caster and camber setting.

It is a further object of this invention to provide a unitary device for checking the mechanical condition of the wheel mounting mechanism as well as measuring caster and camber.

It is a further object of this invention to provide in a device as aforesaid, means for checking the height and squareness of the front wheel axles to obtain an indication of the differences of tire size, tire inflation, and the condition of the knee action mechanism.

It is a further object of this invention to provide in a device as aforesaid means which can be used to indicate the condition of the tie rod ends, idler arm, and sector shaft.

It is a further object of this invention to provide in a device as aforesaid means to indicate the degree of ball joint wear.

It is a further object of this invention to provide in a device as aforesaid means to check the condition of the spindle arm.

It is a further object of this invention to provide in a device as aforesaid means for measuring the toe-in and toe-out.

These and other objects of the invention will become manifest upon reading the following description in conjunction with the accompanying drawings wherein:

FIG. 1 is a perspective view of the wheel checking and aligning apparatus of the invention;

FIG. 2 is a view on the line 2—2 of FIG. 3;

FIG. 3 is a view on line 3—3 of FIG. 2; and

FIG. 4 is a view of a scale for indicating the degree of bending of the spindle and for indicating the amount of toe-in and toe-out, and turning radius.

In accordance with the invention the front end is checked for wear, looseness, bent parts, and misadjustment and ball joint wear before setting the proper caster and camber. The safety and proper adjustment of the front end is thus assured.

The apparatus of the invention gives an indication of the trueness of the front axles, the condition of the knee action mechanism, tie-rod, idler arm and section shaft, the wear of the ball joints, and the straightness of the spindle arm and turning radius. Parts that are worn, bent and/or out of proper adjustment are revealed and corrective steps such as replacement, straightening, and adjusting can be taken before setting the caster and camber.

The apparatus of this invention comprises a pair of spaced parallel ramps 2, only one of which is shown in the drawings, upon which the wheels of a vehicle are adapted to roll. A guide plate 4 is secured to the end of each ramp as by threaded fasteners 6. Each plate is provided with a track 8, for a purpose to be explained below, and with a pair of brackets 10 to which is secured a rod or guide bar 12 to provide a guide for a carriage as more fully explained below. The brackets are secured to the plate by threaded fasteners in the form of screws 14.

A pair of carriages, one adjacent each end of ramps 2 and each comprising a vertical plate 16, are supported for movement on a floor 18 by a wheel 20 rotatably mounted thereon by an axle 22. A guide bracket 24 is secured to plate 16 by means of threaded fasteners 26. A guide ring 28 is secured to the bracket as by welding and is slidably mounted on guide bar 12 to guide the carriage for movement laterally of the ramp.

A bearing support 30 is secured to plate 16 as by welding and a plain bearing in the form of a ring 32 and made of a suitable material such as Babbitt metal is mounted in the support to rotatably support a turntable 34 in as frictionless a manner as possible. The table of one of the carriages is provided with a post 36 connected via a gear train 38, mounted in a housing 40, to a motor 42. A torque limiting device 44 is connected to the post and gear train to limit the torque applied by the motor to the post. Suitable torque limiting devices are well known and could be such as disclosed in Patents 2,429,561 and 2,870,886.

The motor is secured to the plate 16 by a bracket 46 and is controlled by a reversing switch 48 to jog the motor in the forward and reverse directions by manipulations of buttons 50.

A base 52 is secured to turntable 34 as by welding and is provided with a track comprising a pair of rods 54 secured thereto for slidably receiving grooves 56 in a carrier 58 for supporting the carrier for movement transvesely of the ramps.

The carrier is provided with a track comprising a pair of rods 50 secured thereto for slidably receiving grooves 62 in a support 64 for supporting the support for movement parallel to or in the direction of the length of the ramps.

It is preferred to curve the rods 54, 60 and grooves 56, 62 with a radius R which is long compared to the radius of the vehicle wheel. By this curvature there is substantially no binding of the carrier with either the base or support. However, the tracks could be straight since the binding is not too great and can be tolerated.

A bracket 66 is secured to the base 52 as by threaded fasteners 68 and brackets 70 are secured to carrier 58 as by threaded fasteners 72. A bar 74 is pivotally mounted on the brackets 70 and is formed with a flattened section 76. A spherical seat is formed in bracket 66 to support a threaded spherical member 78. A threaded rod 80 is formed at one end with a fixed flange 82, an unthreaded portion 84, and a flange in the form of a washer 86 secured thereto as by a pin. The reduced section 76 is received between flanges 82 and 86 to provide a rotatable mounting for the threaded rod in the bar. A threaded portion of rod 80 is threaded through the spherical member 78. A coupling head in the form of a hexagonal nut 88 is secured to the threaded member 80, as by a pin 90, for connection to a power tool. By rotation of the threaded member the carrier is moved laterally of the ramp. The pivotal connection of bar 74 with brackets 70 and the universal mounting provided by the spherical member 78 in the spherical seat therefor in bracket 66 provides for the free movement of the carrier along the curved track on base 52. In a similar manner a bracket 92 is secured to the carrier 58 and brackets 94 are secured to the support 64. A bar 96 is pivotally mounted in brackets 94 and a threaded member 97 similar to member 80 is threaded through a spherical member 98 and rotatably mounted in bar 96. By connection of a tool to coupling head 100 the support is moved longitudinally of the ramp.

The support is provided with a pair of gripping members 102 and 104 for securely gripping the front wheels W of a vehicle. Each gripper is pivotally mounted in the support 64 by means of pins 106 and 108. A rod 110 formed with oppositely threaded portions 112 and 114 is rotatably mounted in the support. Nut elements 116 and 118 are threadedly mounted on the threaded portions 112 and 114 for movement in opposite directions upon rotation of the rod. A link 120 pivotally connects each nut with a gripper so that movement of the nuts causes the grippers to securely grip or release the associated wheel depending upon the direction of rotation of rod 110. A coupling head 122 similar to heads 88 and 100 is secured to the rod 110.

A cover plate 124 is secured to the support to cover the gripper operating rod, nuts, and links which are contained in a well in the support.

An indicator comprising a guide 126 is pivotally mounted in a pair of ears 128 integral with the gripper that bears against the outer lateral face of the wheel W. A thumb screw 130 is threadedly mounted in one of the ears and bears against a pivot pin of guide 126 to prevent the guide from pivoting. A slide 132 is slidably mounted in the guide 126 and slidably mounts a pointer 134 for vertical sliding movement. A thumb screw 136 is threadedly mounted in the slide to lock the slide in guide 126 and to lock the pointer in the slide. Both slide and guide are provided with index markings 137 and 139. The slide comprises a block 138 having secured thereto square bars 140, 142 on one face and a similar pair of bars are secured to the opposite face. A block 144 is secured to bars 140 and 142 and threadedly receives the thumb screw 136. By screwing the thumb screw into block 144 the end of the screw bears against the pointer to press the pointer against the guide to frictionally lock the pointer and slide against the guide.

A scale 146 is secured to the base as by threaded fasteners 148 and a pointer 150 is secured to the carrier 58 to form an indicator to indicate the amount of linear movement of the carrier relative to the base.

A curved scale 152 is fixed to the carriage by a bracket 154 and a cooperating pointer is secured to the carrier to indicate the relative rotation therebetween. The scale is provided with scales A and B and the pointer is provided with fingers 156 and 158 for cooperation with the scales. A support 160 is slidably but non-rotatably mounted in the carrier and is biased toward the scale by a spring 162. A roller 164 is rotatably mounted in the support to roll on scale 152. A pair of limit switches 166 is mounted on the ends of the scale and operates to de-energize the motor 42 when the roller 164 presses the switch buttons 166 or 168.

A latch member 170 is pivotally mounted on the support 64 by ears 172 and is formed with spaced parallel flanges 174 and 176 to define a guide portion for sliding movement on track 8.

In use, the carriages are moved laterally to accommodate the width of the wheels of the vehicle to be worked on and are locked in the proper position by wheel chocks 21 and 23. The front wheels of the vehicle are moved over the ramps and on to the supporting surfaces of support 64. The clamps are brought against the wheels and the ends of the pointers 134 are aligned with the centers of the axles by releasing the pressure of thumb screws 136 and moving the slide and pointer. The proper angle for the pointer is obtained by releasing the pressure of the thumb screws 130. The distance of the axle height from the support surface is indicated by index marks 139 and the distance of the axles from the aligned tracks 8 is indicated by index marks 137. A difference in the readings on the wheels is a check on the alignment of the axles and the condition of the "knee action" mechanism. An indication of a fault in the alignment and condition of knee action requires correction of the fault before continuing with the following procedures.

The condition of the tie rod ends, idler arm and sector mechanism is tested by releasing the locking member 170 from engagement with track 8 adjacent the carriage that carries the motor and turntable drive and maintaining the other locking member 170 in engagement with the track. The motor is energized to rotate the associated turntable in one direction till the wheel has turned to the limit of its motion and the torque limiter operates to discontinue the drive. A reading is taken on scale A which is marked in degrees and the motor reversed to rotate the wheel to the limit of its motion in the opposite direction as determined by the torque limiter and a second reading taken on scale A. An indication of a fault by too great a difference in the readings would require correction of the fault before continuing with the following procedures.

To check for ball joint wear both locking members 170 are engaged with track 8 and screw 80 is rotated to produce relative linear movement between the carrier 58 (and thereby the support 64) and the base 52. The amount of movement is measured on the scale 146 and gives an indication of the ball joint wear. An indication of a fault in the ball joint requires correction of the fault before continuing with the following procedures.

To check for a bent spindle arm both locking plates are disengaged from tracks 8 and the motor operated to turn the wheels to the limit of motion in each direction and a maximum reading in each direction is obtained on scale A. Failure to obtain proper readings as indicated by the manufacturer's instructions is an indication of a bent spindle arm. An indication of a fault in the spindle arm requires correction of the fault before continuing with the following procedures.

To check for proper toe-in and toe-out both locking plates are disengaged from the tracks and the wheels are rotated by the steering wheel to the limit of motion in one direction. Then the wheels are rotated to the limit of motion in the other direction while the number of revolutions of the steering wheel is counted. By reversing the rotation of the steering wheel from the latter limit of motion and turning it half the number of revolutions counted the wheel should be in a position to steer the vehicle in a dead ahead course. The proper adjustment of the wheels will be indicated by the pointers 158 pointing to the center of scale B or to the position dictated by the manufacturer's specifications. A fault requires correction before continuing with the following procedures.

The final steps for the alignment of the front end are the setting of the proper caster and camber. This has been described in my copending application referred to above and comprises the steps of supporting the weight of a vehicle front end by a jack or the like. Clamps 102 and 104 on each carriage are then operated to grip and hold the wheels. The caster and camber adjustments are loosened and the wheels are set in the proper caster and camber positions by rotating the screws 80 and 97. When the wheels are set in the proper positions the adjustment mechanisms are tightened and the front end is properly aligned and will remain aligned till wear and tear take their toll.

It is to be understood that the proper caster and camber settings are peculiar to various types of suspensions and proper steps for setting caster and camber are not necessarily limited to the specific procedures set forth above.

I claim as my invention:

1. A front end condition measuring apparatus comprising spaced parallel ramps and a wheel mounting condition measuring device slidably connected to each ramp for sliding movement laterally of the ramps, each of said devices comprising a carriage, wheel supporting and gripping means pivotally mounted on the carriage, a motor mounted on only one of said carriages for rotating the associated wheel supporting and gripping means about the pivotal mounting, and means secured to each of said supporting and gripping means and said carriages for indicating the amount of rotational movement between each of the carriages and the associated supporting and gripping means.

2. An apparatus as defined in claim 1 further including means for limiting the driving torque applied by the motor to the supporting and gripping means.

3. An apparatus as defined in claim 2 further including switching means for selectively driving the motor in the forward and reverse directions.

4. An apparatus as defined in claim 1 further including means for locking said supporting and gripping means against rotation.

5. An apparatus as defined in claim 3 further including limit switches connected to the indicating means for deenergizing the motor when the support and gripping means has rotated a preselected amount relative to the associated carriage.

6. An apparatus as defined in claim 4 wherein the locking means comprises a track extending laterally of and secured to each ramp, a latch member pivotally mounted on each of the supporting and gripping means and a guide on the free end thereof for sliding engagement with the track.

7. An apparatus as defined in claim 6 further including means mounting the supporting and gripping means for movement in directions parallel to and laterally of the ramps.

8. An apparatus as defined in claim 7 wherein the mounting means comprises a carrier slidably mounted on the carriage for movement laterally of the ramps and means mounting the supporting and gripping means on the carrier for sliding movement thereon in a direction parallel to the ramps.

9. An apparatus as defined in claim 8 further including means connecting the carrier with the support and gripping means for moving the said support means along the carrier in a direction parallel to the ramp and means connecting the carriage with the carrier for moving the carrier along the carriage in a direction laterally of the ramps.

10. An apparatus as defined in claim 9 further including means secured to the carriage and carrier for indicating the amount of linear movement of the carrier relative to the carriage.

11. An apparatus as defined in claim 10 further including means secured to the gripping means for indicating the height of each axle above the wheel supporting means.

12. An apparatus as defined in claim 11 wherein the indicating means comprises a guide pivotally mounted on the gripping means, a slide mounted in said guide for sliding movement therealong, a pointer slidably mounted in the slide, means for locking the pointer to the slide, and means for locking the guide against pivotal movement on the gripping means.

13. An apparatus as defined in claim 10 wherein the mounting means are curved on a radius that is long compared to the distance of the ends of the pointers above the supports.

14. A front end condition measuring apparatus comprising spaced parallel ramps and a wheel mounting condition measuring device slidably connected to each ramp for sliding movement laterally of the ramps, each of said devices comprising a carriage, wheel supporting and gripping means pivotally mounted on the carriage, means secured to each of said supporting and gripping means and said carriages for indicating the amount of rotational movement between each of the carriages and the associated supporting and gripping means, means for locking said supporting and gripping means against rotation, means mounting the supporting and gripping means for movement in directions parallel to and laterally of the ramps, and means secured to the carriage and the supporting and gripping means for indicating the amount of linear movement thereof relative to the carriage.

References Cited

UNITED STATES PATENTS

| 2,045,109 | 6/1936 | Smith | 33—203.12 |
| 2,133,827 | 10/1938 | Miller | 33—203.12 |
| 2,137,949 | 11/1938 | Phelps | 33—203.13 |
| 2,167,361 | 7/1939 | Haucke | 33—203.12 |
| 2,261,342 | 11/1941 | Darton | 33—203.14 |
| 3,187,440 | 6/1965 | Merrill et al. | 33—203.13 |

FOREIGN PATENTS 144,091  11/1951  Australia.

OTHER REFERENCES

"Bear Wheel Alinement Frame and Body Service Manual," April 1964.

WILLIAM D. MARTIN, JR., *Primary Examiner.*